United States Patent [19]

Dilling

[11] Patent Number: 4,521,336
[45] Date of Patent: Jun. 4, 1985

[54] PROCESS FOR PREPARING LIGNOSULFONATES

[75] Inventor: Peter Dilling, Isle of Palms, S.C.

[73] Assignee: Westvaco Corporation, New York, N.Y.

[21] Appl. No.: 601,047

[22] Filed: Apr. 16, 1984

[51] Int. Cl.³ .............................................. C07G 1/00
[52] U.S. Cl. .................................................... 530/501
[58] Field of Search ......................................... 260/124

[56] References Cited

U.S. PATENT DOCUMENTS

| Re. 31,190 | 3/1983 | Detroit et al. | 260/124 |
|---|---|---|---|
| 2,680,113 | 6/1954 | Adler et al. | 260/124 |
| 2,789,974 | 4/1957 | Hagglund et al. | 260/124 |
| 2,997,466 | 8/1961 | Ball et al. | 260/124 |
| 3,094,515 | 6/1963 | Keirstead et al. | 260/124 |
| 3,156,520 | 11/1964 | Blaisdell | 8/91 |
| 3,216,839 | 11/1965 | Webster | 106/123 |
| 3,546,197 | 12/1970 | Benko | 260/124 |
| 3,634,387 | 1/1972 | Dougherty | 260/124 |
| 3,726,850 | 4/1973 | Detroit | 260/124 A |
| 3,769,272 | 10/1973 | Hintz | 260/124 R |
| 4,001,202 | 1/1977 | Dilling et al. | 260/124 R |
| 4,007,004 | 2/1977 | Bailey, III et al. | 8/83 |
| 4,131,564 | 12/1978 | Dilling | 252/353 |
| 4,184,845 | 1/1980 | Lin | 8/34 |
| 4,338,091 | 7/1982 | Dilling | 260/124 |

FOREIGN PATENT DOCUMENTS 2404856  6/1978  Fed. Rep. of Germany .

OTHER PUBLICATIONS

Sarkanen et al., "Lignins" (1971), 288–289.
Brauns et al., *The Chemistry of Lignin*, Supplement vol. (1960), pp. 553–555.

*Primary Examiner*—Delbert R. Phillips
*Attorney, Agent, or Firm*—Terry B. McDaniel; Richard L. Schmalz

[57] ABSTRACT

Disclosed herein is a process for preparing sulfonated lignins by selectively isolating lignins having molecular weights greater than 5,000 and subsequently reacting the lignin with sodium sulfite and an aldehyde. The resulting sulfonated lignins are useful as dispersants for disperse dyes and vat dyes.

10 Claims, No Drawings

PROCESS FOR PREPARING LIGNOSULFONATES

BACKGROUND OF THE INVENTION

(1) Field of the Invention

This invention relates to a new and improved process for preparing sulfonated lignins and more particularly to a process for preparing sulfonated lignins of low viscosity possessing improved heat stability properties.

(2) The Prior Art

Dyestuff compositions generally comprise a dye cake, i.e., of disperse dyes or vat dyes, and a dispersant. These dyestuff compositions are widely used to color both natural and synthetic fibers. In the dyestuff composition, the dispersant serves three basic functions: (1) it assists in reducing the dye particle to a fine size; (2) it maintains a dispersing medium; and (3) it is used as a diluent.

Dye dispersants are generally one of two major types, sulfonated lignins from the wood pulping industry via the sulfite or kraft processes or napthalene sulfonates from the petroleum industry.

The advantages of employing sulfonated lignins as dispersants in dyestuff compositions is based on their unique physical properties which include good compatibility to many dye systems, outstanding dispersant characteristics at ambient and elevated temperatures and availability. There are, however, a number of disadvantages in employing lignins, whether they are sulfite lignins or sulfonated kraft lignins, as dispersants. These negative factors relate to fiber staining, heat stability and viscosity of the lignins employed. These adverse properties are troublesome to dyers and many attempts have been made to overcome these disadvantages.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. U.S. Pat. No. 4,001,202, which names as a co-inventor the sole inventor in this application, describes a process for preparing a sulfonated lignin with improved fiber staining properties useful as a dye dispersant, by reacting such lignin with an epihalohydrin. Also, U.S. Pat. No. 4,338,091, issued to the inventor in this application, teaches reacting a modified lignin with sodium sulfite and an aldehyde. The lignin is modified, however, by a pretreatment with sodium dithionate; thus, the subsequent reaction does not involve the lignin material of the present invention.

Additional examples of reacting or modifying lignins to make them more suitable as dye dispersants include U.S. Pat. Nos. 4,184,845, 4,131,564, 3,156,520, 3,094,515, 3,726,850, 2,680,113, and 3,769,272. The art cited is meant to show the state of the art and is not intended to be all inclusive of lignin modifications.

Although the methods for treating and preparing sulfonated lignins described above offer some advantage during dyeing, none have produced a product possessing the improvements obtained by the products made according to the claimed process.

It is the general object of this invention to provide a process whereby sulfonated lignins or lignosulfonates may be prepared to improve their usefulness as dye dispersants.

Another object of this invention is to provide a process for reducing the viscosity of sulfonated lignins or lignosulfonates.

Another object of this invention is to provide a process for improving the heat stability of sulfonated lignins or lignosulfonates.

Other objects, features and advantages of this invention will be seen in the following detailed description of the invention.

SUMMARY OF THE INVENTION

It has been found that the viscosity of sulfonated lignins useful as dye dispersants in dyestuff compositions can be reduced with improvement in the heat stability properties of the lignin by removing the low molecular weight component of the lignin and reacting the resulting lignin material with sodium sulfite ($Na_2SO_3$) and an aldehyde at a low pH.

DETAILED DESCRIPTION OF THE INVENTION

Lignin is obtained from spent pulping liquors, known as black liquor, of the pulping industry where lignocellulosic materials, such as wood, straw, corn stalks, bagasse, and the like, are processed to separate the cellulose or pulp from the lignin. The lignins employed in the process of this invention are obtained, preferably, from the kraft wood pulping process wherein the natural lignin is present as a sodium salt. In kraft pulping, the wood is subjected to the effects of strong alkali. The lignin in this process forms a soluble sodium salt which is separated from the cellulose and dissolves in the pulping liquor. The lignin is recovered from the spent pulping liquor, known as black liquor, by acidification.

Acidification of the black liquor containing the lignin salt is accomplished by the introduction of carbon dioxide. Upon the addition of carbon dioxide to the black liquor, the phenolic hydroxide groups on the lignin molecule, which are in ionized form, are converted into their free phenolic or acidic form. This conversion renders the lignin insoluble in the black liquor as a result of which it precipitates out.

The lignins present in black liquor exist at various molecular weights. Lignins with a molecular weight of about 5,000 or less have been found to negatively affect the heat stability of any subsequently sulfonated lignin materials. In the practice of the present invention, the acidification of the alkaline black liquor containing the lignin salt takes place at a pH where all but a negligible amount of the lignins having a molecular weight of about 5,000 or less do not precipitate out with the higher molecular weight lignin products, and, therefore, remain in solution with the black liquor. Generally, this selective acidification of black liquor to remove the lignins should occur at a pH ranging from about 9.7 to about 11.0 to minimize the amount of lignins removed having molecular weights of 5,000 or less. Preferably, the acidification should occur at a pH ranging from about 10.0 to about 11.0, such that essentially no lignins having molecular weights of 5,000 or less are removed from the black liquor.

The alkali lignins are usually recovered from black liquor as water insoluble products by this precipitation procedure. Lignin obtained from the kraft, soda or other alkaline processes, to which this invention is directed, is not recovered as a sulfonated product, but is easily sulfonated by reacting such material with a bisulfite or sulfite. A sulfonated lignin is any lignin containing at least an effective amount of sulfonated groups to give water solubility in moderately acid and higher pH solutions.

The next step in developing a lignin-based dye dispersant is to properly sulfonate the lignin. It should be noted that the degree of sulfonation of a lignin is proportional to the solubility of that lignin in an aqueous solution and the viscosity of such lignin.

One of the conventional processes for sulfonating a lignin involves the sulfomethylation of alkali lignin by reacting such lignin with sodium sulfite and formaldehyde. This process is mentioned by E. Adler et al. in U.S. Pat. No. 2,680,113. Sulfomethylation acts upon the aromatic nuclei of the lignin molecule in such a manner that —$CH_2SO_3H$ groups are bonded to such nuclei. Adler teaches that the treatment of the lignin with these sulfonation agents is carried out within a temperature range of 50° C. to 200° C., suitably 80° C. to 170° C., preferably 100° C. to 160° C. The quantity of sulfite used, calculated as anhydrous sodium sulfite, may vary from about 10% to 100% of the quantity of anhydrous lignin and the quantity of aldehyde is equivalent to the quantity of sulfite or lower, down to about 1%, calculated on the quantity of the anhydrous lignin material. The treatment is preferably carried out in an alkaline solution.

In the practice of the present invention, the alkali lignin is mixed with water to form a slurry. To the slurry the sulfomethylation agents are added, i.e., sodium sulfite and formaldehyde. The ratio of sodium sulfite to formaldehyde ranges from about 1.1:0.1 to about 2.5:1.0, the preferred range being about 1.3:0.8. It has been found that the addition of excess amounts of sodium sulfite as compared to formaldehyde yields a sulfonated lignin product with reduced molecular weight.

When formaldehyde and sodium sulfite are combined in stoichiometric amounts, they form, almost instantaneously a hydroxy methanesulfonate, which in turn undergoes reaction with the lignin to form sulfonated lignin derivatives. The hydroxy methanesulfonate intermediate exists to only 90% in the desired form, while 10% of the reactants are present at all times. A problem with having 10% of the reactants present is that formaldehyde undergoes coupling reactions with the lignin being sulfomethylated. It would, therefore, be advantageous to have as small an amount of unreacted formaldehyde in the reaction mixture as possible. This can be accomplished by varying the mole ratio of sodium sulfite to formaldehyde. Increasing the mole ratio of sodium sulfite to formaldehyde results in the generation of a greater amount of hydroxy methanesulfonate intermediate at the expense of remaining amounts of unreacted formaldehyde. The increased quantities of sodium sulfite result in a lower degree of polymerization and consequentially a sulfonated lignin with a lower molecular weight.

Under prior practices, the sodium sulfite and formaldehyde were added to a lignin solution having an initial pH of about 9.0. The addition of the sulfonation agents would raise the pH of the resulting sulfonated lignin solution to an even higher level. In the practice of the present invention, the precipitated lignin is subjected to an acid washing procedure, preferably with sulfuric acid, and dried to produce a lignin material having a pH ranging from about 1.5 to about 5.0. The lignin is combined with water to form a slurry of about 25% solids. The lignin exists at this pH range in precipitated form. If the lignin slurry pH is below 5, the pH is adjusted to about 5.0 through the use of sodium hydroxide. At this point, sodium sulfite is added to raise the initial pH of the reaction mixture to a range of about 7.0 to 7.5.

Sulfonation occurs with the addition of formaldehyde which raises the pH of the slurry to a range of about 8.0 to about 9.2. The slurry is then taken to a temperature ranging from about 130° C. to about 175° C., the preferable temperature being about 140° C. The temperature is maintained for a period of time ranging from about 30 minutes to 12 hours, the most preferable being about 2 hours.

The use of low pH and low temperature has two advantages. For one thing, the lignin is less likely to decompose at these conditions than under the normal reaction conditions. The fact that the sulfonation occurs at a low pH means that the resulting sulfonated lignin product will possess a pH lower than would otherwise be obtainable.

When sulfonated lignins are employed as dye dispersants, it is preferred that the pH of such lignin range from about 4 to about 8. If a lignin is sulfonated at a high pH, the resulting sulfonated lignin will have a high pH. In order for a dyer to use such sulfonated lignin as a dispersant, the dyer is required to add an acid to such lignin to lower the pH which translates into additional expense. By sulfonating the lignin at a low pH, a sulfonated lignin is obtained which does not require the use of acid to render it suitable as a dye dispersant.

The elimination of the need to employ an acid to lower the pH of sulfonated lignin, in order to use it as a dispersant, has an additional advantage besides cost. The use of an acid to lower the pH normally results in the production of an electrolyte. The presence of an electrolyte in the sulfonated lignin has a tendency to affect in a negative manner the heat stability of certain dye products which contain such lignin as a dispersant. The elimination of the need to add acid to the sulfonated lignin avoids the problems associated with the presence of electrolytes.

The sulfonated lignins prepared in accordance with the present invention can be employed as dispersants in dyestuff compositions. The amount of such dispersant required will vary depending upon the particular dye cake, the material to be dyed and the effect desired. Amounts up to 75% of the dispersant, based upon the weight of dried cake, may be used. The most important factor in determining the proper amount of dispersant composition to be used in making up the dyestuff is the particular dye cake used. Generally, this amount will vary from dye to dye.

The following are examples only and should not be construed as limiting the invention.

EXAMPLE 1

Lignin was isolated from spent pulping liquors from the kraft wood pulping process through acidification of the pulping liquors under various pH conditions as indicated in Table I. The isolated lignin was acid-washed with sulfuric acid to a pH of about 5.0. A 25% solids slurry of lignin was prepared by admixing the recovered lignin with water. Sodium sulfite was added to the slurry at a pH of about 5.0. Formaldehyde followed the addition of sodium sulfite in close sequence. Upon addition of both sulfomethylation ingredients, the pH of the reaction mixture was 8.6–9.2 and the temperature was adjusted to 70° C. After 1 hour the temperature was raised to 140° C. and maintained for 2 hours.

The viscosities of the sulfonated lignin product resulting from each of the samples were determined and are reported in Table I. The heat stability properties of the sulfonated lignin products resulting from each of the samples were also determined and appear in Table I.

Viscosity was measured by heating the sulfonated lignin solution to about 70° C. and adding glacial acetic acid slowly until a pH of 8 was obtained. The solids concentration was adjusted to 25%. A Brookfield Viscometer (model LVT) was used for all measurements. Measurements took place at 25° C.

Heat stability was determined by preparing a dye composition containing the sulfonated lignin. The dye composition was prepared by mixing 50 grams of Red I, 35 grams of sulfonated lignin, 125 milliliters of water and 5 drops of EDTA (1% solids at pH of from 8.6 to 9.2). The pH was adjusted to 8 with acetic acid or sulfuric acid. The dye composition was ground in a ball mill to the point where the filter test for disperse dyes was passed.

Heat stability was measured by adding 1 gram of the solid dye composition to 250 milliliters of water. The solution was boiled for 15 minutes and then filtered through a tared Whatman filter paper No. 2 above a No. 4 (with vacuum) as specified in the standard American Association of Textile Chemists and Colorists (AATCC) heat stability test. The filter paper was dried, and the residue dye material remaining on the filter was calculated.

The data in Table I clearly indicates that the pH at which lignin is isolated from black liquor has a substantial effect on the sulfonated lignins subsequently produced. Improvements in viscosity and the heat stability of the sulfonated lignins are notable when raising the pH at which black liquor is isolated.

TABLE I

| Lignin Isolation pH from Black Liquor | Mole Ratio $Na_2SO_3$ $CH_2O$ | Starting pH | Final pH | Viscosity at pH 25% Solids | Heat Stability Filter Residue (mg) |
|---|---|---|---|---|---|
| 9.2 | 1.3/0.8 | 8.7 | 8.90 | 8,500.0 | 128.0 |
| 9.7 | 1.3/0.8 | 8.7 | 8.95 | 117.5 | 60.0 |
| 10.1 | 1.3/0.8 | 8.6 | 8.63 | 27.0 | 18.5 |

EXAMPLE 2

Lignin was isolated from spent pulping liquors from the kraft wood pulping process through acidification of the pulping liquors at a pH of about 9.8. The isolated lignin was acid-washed with sulfuric acid to a pH of about 5.0. A 25% solids slurry of lignin was prepared by admixing the recovered lignin with water. Sodium sulfite was added to the slurry at a pH of about 5.0. Formaldehyde followed the addition of sodium sulfite in close sequence. Upon addition of both sulfomethylation ingredients, the pH of the reaction mixture was adjusted to various levels indicated in Table II. The temperature of the reaction mixture was adjusted to 70° C. and maintained at such condition for 1 hour after which the temperature was raised to 140° C. and maintained for 2 hours.

The viscosity of the sulfonated lignin product resulting from each of the samples was determined and is reported in Table II. Viscosity was measured in accordance with the procedure outlined in Example 1.

The heat stability of the sulfonated lignin product resulting from each of the samples was determined and is reported in Table II. Heat stability was measured in accordance with the procedure outlined in Example 1.

The data in Table II clearly indicate that the pH of which the sulfonation of lignin occurs in conjunction with the mole ratio of sulfonating agents has a substantial effect on the sulfonated lignins subsequently produced. Improvements in viscosity and the heat stability of the sulfonated lignins are notable.

TABLE II

| Mole Ratio $Na_2SO_3$ $CH_2O$ | Starting pH | Final pH | Viscosity at pH 25% Solids | Heat Stability Filter Residue (mg) |
|---|---|---|---|---|
| 1.0/1.0 | 10.3 | 10.40 | 400,000 | 38.0* |
| 1.0/1.0 | 9.9 | 10.65 | 400,000 | 18.5 |
| 1.3/0.8 | 8.6 | 8.70 | 27 | 18.0 |
| 1.4/0.7 | 8.9 | 9.25 | 23 | 26.7 |
| 1.5/0.5 | 9.0 | 9.40 | 22 | 103.0 |
| 2.0/1.15 | 9.6 | 9.80 | 24 | 302.0 |

*Lignin was manufactured at 100° C. instead of 140° C.

While the foregoing examples have illustrated an embodiment of the invention, it should be understood that other variations and modifications falling within the scope of the appended claims are to be included therein.

What is claimed is:

1. In a process for preparing sulfonated lignins which comprises reacting lignin material with an aldehyde and a sulfite, selected from the group consisting of water soluble sulfites and bisulfites, wherein the improvement comprises the steps of
    (a) selectively isolating the lignin material from alkaline black liquor by reducing the black liquor pH such that all but a negligible amount of the lignins having a molecular weight of 5,000 or less remain in solution with the black liquor,
    (b) acidifying the lignin material to a pH of from about 1.5 to about 5.0 by washing with sulfuric acid followed by adding water to the lignin material to form a slurry of about 25% solids,
    (c) adding to the lignin slurry the sulfite and the aldehyde in a sulfite to aldehyde mole ratio of from about 1.1:0.1 to about 2.5:1.0, which addition produces an initial reaction pH of from about 8.0 to about 9.2, and
    (d) the temperature of reaction is raised from ambient to from about 130° C. to about 175° C. for from about 0.5 to about 12 hours.

2. The process of claim 1 wherein the lignin material is isolated from the black liquor at a pH ranging from about 9.7 to about 11.0.

3. The process of claim 2 wherein the pH range is from about 10.0 to about 11.0.

4. The process of claim 1 wherein the water soluble sulfite is sodium sulfite and the aldehyde is formaldehyde.

5. The process of claim 4 wherein the mole ratio of sodium sulfite to formaldehyde is about 1.3:0.8.

6. The process of claim 1 wherein the initial reaction pH is about 8.6.

7. The process of claim 1 wherein the addition of sulfite and aldehyde is sequential in that order.

8. The process of claim 1 wherein the reaction temperature is first raised to 70° C. for 1 hour after step (c) and before step (d).

9. The process of claim 8 wherein the reaction temperature of step (d) is 140° C. and said temperature is maintained for 2 hours.

10. The process of claim 1 wherein the lignin slurry pH below 5.0 is raised to 5.0 by addition of sodium hydroxide.

* * * * *